L. H. Thomas,
Steel Trap,
N° 49,174. Patented Aug. 1, 1865.

Witnesses:
T. A. Mitchell
J. S. Adams

Inventor:
Levi H. Thomas

UNITED STATES PATENT OFFICE.

LEVI H. THOMAS, M. D., OF WATERBURY, VERMONT.

IMPROVEMENT IN STEEL TRAPS.

Specification forming part of Letters Patent No. 49,174, dated August 1, 1865.

*To all whom it may concern:*

Be it known that I, LEVI H. THOMAS, M. D., of Waterbury, in the county of Washington, in the State of Vermont, have invented certain new and useful Improvements in Animal-Traps; and the following is a clear, full, and exact description of the same, reference being had to the accompanying drawings, making a part of this specification, in which—

Figure 1:
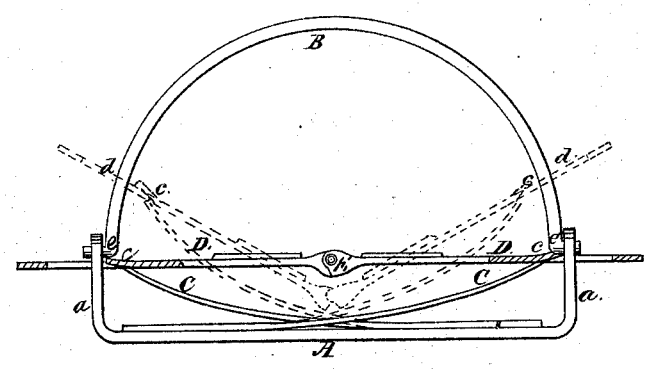
Figure 3:
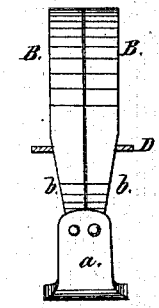
Figure 2:
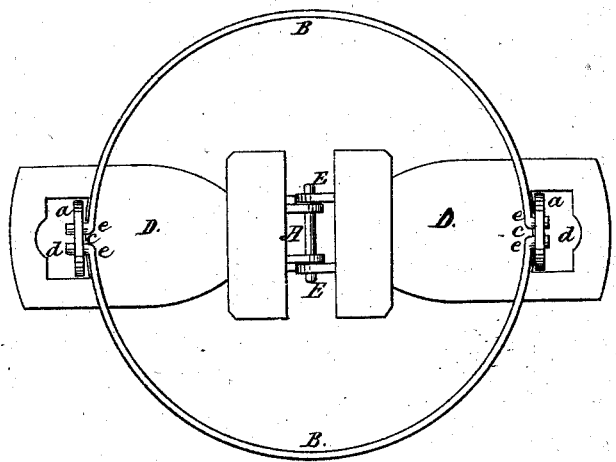

Figure 1 represents a side view of the trap with the springs depressed and set by the jointed double pan, their position when sprung shown in red lines. Fig. 2 shows a plan or top view of the trap when set. Fig. 3 shows an end view in section.

My invention consists in a jointed double pan extending the whole length of the trap, each section of the pan having an opening near its outward end, which embraces the jaws. The ends of the pan, when brought into a line or plane, extend so as to form catches under the angles of the jaws, and thereby hold the springs in tension, so that the trap is set without any other manipulation than by forcing the pan upon the springs, and is easily sprung by depressing the jointed pan anywhere between the angles of the jaws.

To enable others skilled in the art to make and use my invention, I will describe it in detail, referring to the drawings, and to the letters marked thereon.

The frame or bed-piece A may be made of cast or wrought metal, of any desired dimensions, the ends *a a* being curved or turned up so as to form a right angle with the line of the base A, for the purpose of forming ears of the same piece, into which the jaws B B of the trap are pivoted.

To the upper side of the frame A, near the ears *a a*, are secured the springs C C, they being so formed as to pass by each other and extend the whole length of the space between the ears of the trap, and each spring has its bearing on the under side of the jointed pan D D near to the openings *d d*, which embrace the jaws *b b*, to hold them together when the trap is sprung.

The pan D D may be made of sheet metal, of any desired width, it having a joint or hinge, E, in the center between the openings *d d*, so that it may be elevated and brought into a plane when the trap is set or depressed when it is sprung, as seen in red lines in Fig. 1. At a suitable distance from each end of the pan D D are openings *d d*, sufficiently large to pass freely over the ears *a a* when the trap is set, the width being such as to press upon the inclines or wedge-shaped portion of the jaws *b b*, as seen in Fig. 3, when the trap is sprung. The openings *d d* in the pan are pressed or punched out in such shape as to leave a circular lip, *c c*, on the inner portion toward the joint E. These lips *c c* form the catches to hold the trap set by fixing their bearings under the angles *e e* of the jaws B B when the pan D D is pressed upon the springs C C, so as to bring the lips *c c* under the angles of the jaws. Thus it will be seen that the trap is set by simply pressing the ends of the pan down upon the springs without moving or affecting the position of the jaws, they being placed in any desired position after the tension is on the springs, so that there is less liability of being injured by any accidental springing of the trap while setting.

Among the advantages to be derived from my mode of constructing and the arrangement of the parts is the ease and facility with which the trap can be set, the ends of the pan extending out beyond the jaws acting as levers to force down the springs, so that not more than one-half of the power applied is required to set this that is necessary to set any other trap that has the same strength of spring. This differs also from other traps in that the pan forms the catches to hold the trap set, and by its elongation, as the springs are depressed, is self-setting; and, furthermore, the two ends of the pan hold the jaws together instead of the springs, and both ends of the jaws are clamped and the pressure equalized by the pan, which also presents a larger surface, on which the animal may step or press to spring the trap; and, furthermore, the arrangement of placing two springs directly under the pan and within the circumference of the jaws makes the trap very compact, which is of great advantage for storing, transportation, and secreting them in places for entrapping cunning animals.

Having thus fully described my invention, what I claim as new, and desire to secure by Letters Patent, is—

1. The jointed pan, so constructed and arranged as to embrace both ends of the jaws and hold them closed.

2. Holding the trap set, the pan forming the catches under the angles of the jaws.

3. Placing springs within the circumference of the jaws, acting directly upon the pan, whereby they hold the trap either set or sprung.

4. The mode of constructing animal-traps, whereby the pan forms the levers for setting.

5. The jointed double pan, in combination with the springs and jaws, the same being constructed and operating in the manner herein described, for the purposes specified.

LEVI H. THOMAS.

Witnesses:
D. H. MITCHELL,
J. S. ADAMS.